UNITED STATES PATENT OFFICE.

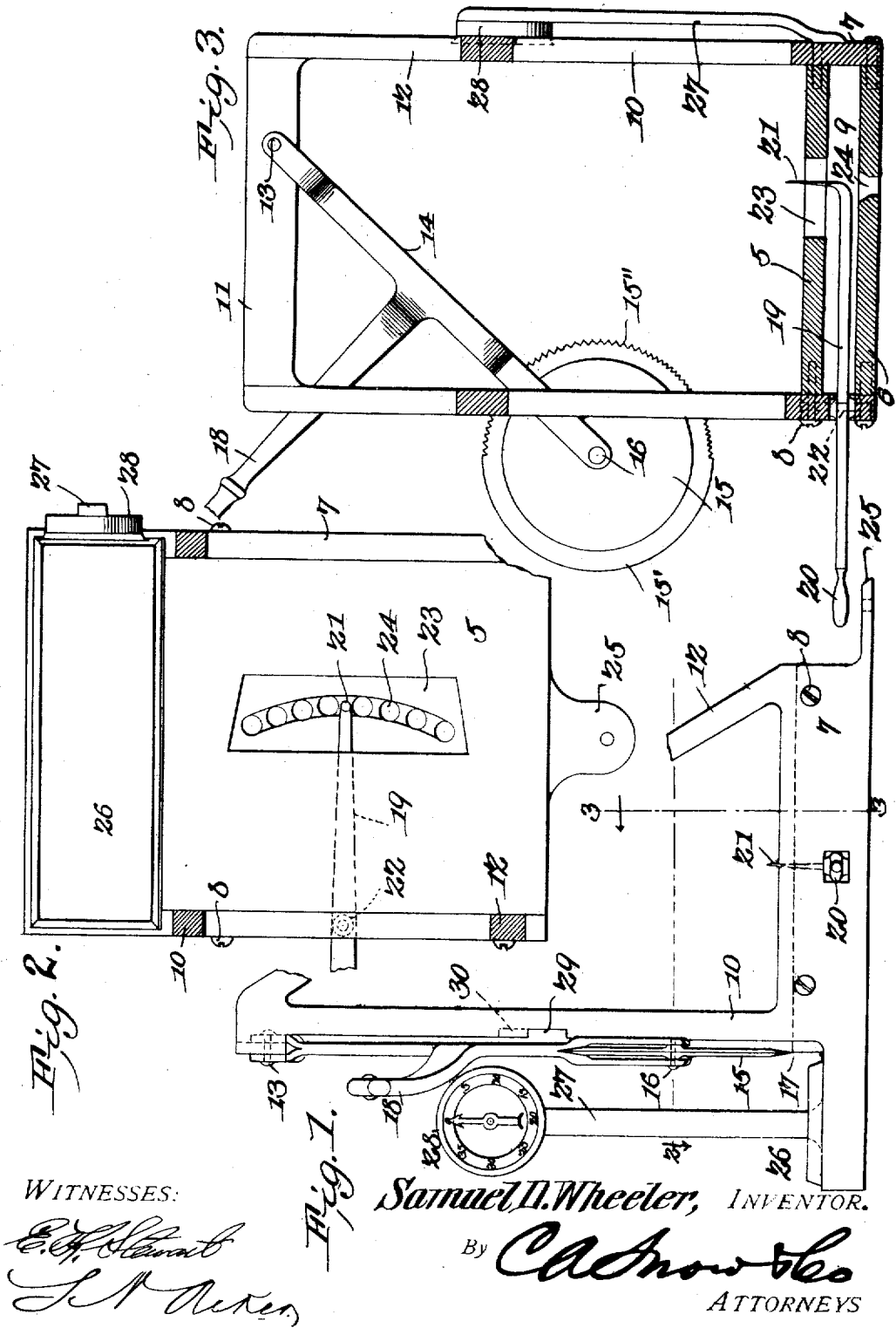

SAMUEL D. WHEELER, OF BRINSON, GEORGIA, ASSIGNOR TO S. D. WHEELER & CO., OF BRINSON, GEORGIA.

MEAT-CUTTER.

No. 844,434. Specification of Letters Patent. Patented Feb. 19, 1907.

Application filed April 9, 1906. Serial No. 310,810.

*To all whom it may concern:*

Be it known that I, SAMUEL D. WHEELER, a citizen of the United States, residing at Brinson, in the county of Decatur and State of Georgia, have invented a new and useful Meat-Cutter, of which the following is a specification.

This invention relates to meat-cutting machines, and has for its object to provide a comparatively simple and inexpensive machine of this character especially designed for use in butcher-shops, retail stores, and the like and by means of which the operator may conveniently cut or sever slices of meat of any desired thickness and accurately weigh the same.

A further object of the invention is to provide a revolving cutter pivotally mounted for swinging movement and having a portion of its periphery provided with a cutting edge and its adjacent portion formed with spaced saw-teeth.

A further object of the invention is to provide means for feeding the meat to the cutter and means for locking the latter in inoperative position.

A still further object is to generally improve this class of devices so as to increase their utility, durability, and efficiency, as well as to reduce the cost of manufacture.

With these and other objects in view the invention consists in the construction and novel combination and arrangement of parts hereinafter fully described, and illustrated in the accompanying drawings, it being understood that various changes in form, proportions, and minor details of construction may be resorted to within the scope of the appended claims.

In the accompanying drawings, forming a part of this specification, Figure 1 is a side elevation of a meat-cutter constructed in accordance with my invention. Fig. 2 is a transverse sectional view taken on the line 2 2 of Fig. 1 looking in the direction of the arrow. Fig. 3 is a longitudinal sectional view taken on the line 3 3 of Fig. 1 looking in the direction of the arrow.

Similar numerals of reference indicate corresponding parts in all of the figures of the drawings.

The improved device consists of a platform comprising parallel plates 5 and 6, secured in any suitable manner to the side rails 7, as by screws or similar fastening devices 8, said plates being spaced apart to form an intermediate chamber 9.

Secured to or formed integral with the side rails 7 are spaced uprights 10, connected at their free ends by a transverse bar 11 and also connected to the rear ends of the side rails 7 by diagonal or inclined braces 12. Pivotally mounted on the bar 7, as indicated at 13, is a hanger 14, the free end of which is bifurcated for the reception of a revolving cutter 15, the latter being journaled in suitable bearings 16, formed in the bifurcated end of the hanger, as shown, said cutter being circular in shape and having a portion of its periphery provided with a cutting edge 15' and its adjacent portion formed with saw-teeth, as indicated at 15'', whereby the cutter may be used either for slicing lean meat or for sawing through bone, gristle, and other hard substances when the cutter is locked against rotation within the free or bifurcated end of the hanger 14.

The cutter 15 is movable transversely across the forward edge 17 of the plate 5 and is operated by means of a hand-lever 18, carried by and extending at substantially right angles to the hanger 14.

As a means for feeding the meat to the cutter there is provided a lever 19, one end of which is provided with a handle 20, while the opposite end thereof is bent at right angles to the longitudinal plane of said lever to form a piercing-point 21. The lever 19 is pivotally mounted at 22 for lateral movement within the chamber 9, while the piercing-point 21 of said lever projects through an opening 23 in the upper plate 5 for engagement with the meat, sausage, or other material to be cut or severed. The lower plate 6 is preferably formed with a series of openings or recesses 24, through which any particles of meat, fat, and the like may be discharged.

The platform is provided with a rearwardly-extending perforated lug 25 for attaching the device to a counter or other suitable support, and the side rails 7 of said platform are preferably extended beyond the edge 17 of the upper plate 5 to form a support for a platform-scale 26. The scale 26 is provided with a vertical tube or standard 27, having a dial or indicator 28 mounted thereon and operatively connected with the weighing mechanism, whereby the detached or severed portion of the meat may be accurately weighed and the amount indicated on the dial 28.

As a means for locking the cutter in inoperative position one of the vertical supports or standards 10 is formed with a notch or recess 29, the walls of which are inclined or beveled, as indicated at 30, for engagement with the adjacent portion of the hanger 14.

In operation the meat, sausage, or other material to be cut or severed is placed in position on the platform or plate 5 and pressed downwardly into engagement with the piercing member 21. The lever 20 is then moved laterally, which causes the meat to be fed to the cutter, said cutter being actuated by depressing the lever 18 to cut or sever a single slice of meat. As the meat is cut or severed it falls upon the platform 26, so that by glancing at the indicator 28 the operator may determine the exact weight of the severed portion.

When the machine is not in use, the cutter may be supported in inoperative position by elevating the same until the hanger 14 engages the locking notch or recess 30.

From the foregoing description it is thought that the construction and operation of the devices will be readily understood by those skilled in the art, and further description thereof is deemed unnecessary.

Having thus described the invention, what is claimed is—

1. In a meat-cutting machine, a platform comprising a plurality of plates spaced apart by side rails to form an intermediate chamber, one of said rails being provided with an opening, spaced uprights secured to the platform and connected by a transverse beam, inclined bars connecting the platform and beam, a hanger pivotally mounted for swinging movement on the beam and having its free end bifurcated, a cutter mounted for rotation in the bifurcated end of the hanger and having a portion of its periphery formed of saw-teeth, a longitudinally-disposed lever pivotally mounted for lateral movement within the chamber and having one end thereof extended through the opening in the side rail and its opposite end provided with a terminal point adapted to pierce the meat when feeding the latter to the cutter.

2. In a meat-cutting machine, a platform provided with spaced plates connected by side rails and defining an intermediate chamber, uprights secured to the platform and connected by a transverse beam, one of said uprights being provided with a recess, inclined braces connecting the platform and beam, respectively, a hanger pivotally mounted for swinging movement on said beam and having its free end bifurcated, a cutter mounted for rotation in the bifurcated end of the hanger, a lever pivoted within the chamber and provided with a terminal plate adapted to engage the meat for feeding the latter to the cutter, and an operating-handle extending laterally from the hanger, said hanger being adapted to enter the recess in the upright for locking the cutter in inoperative position.

3. In a meat-cutting machine, a platform comprising a pair of spaced plates connected by side rails and defining an intermediate chamber, one of said plates being formed with an opening and the adjacent plate with a series of spaced perforations disposed beneath and in alinement with the opening, uprights secured to the platform and connected by a transverse beam, one of said uprights being provided with a recess opening through the adjacent face thereof, a hanger pivotally mounted for swinging movement on the transverse beam at one side of the center of the latter and having its free end bifurcated, said hanger being provided with a laterally-extending operating-handle, a cutter mounted for rotation in the bifurcated end of the hanger, a lever pivoted within the chamber and having one end thereof extended through the opening in the adjacent plate for feeding the meat to the cutter, said hanger being adapted to enter the recess in the upright for locking the latter in inoperative position, the side rails of the platform being extended longitudinally beyond the uprights to form a support for a weighing mechanism.

In testimony that I claim the foregoing as my own I have hereto affixed my signature in the presence of two witnesses.

S. D. WHEELER.

Witnesses:
C. R. HODGES,
W. R. BROWN.